Sept. 3, 1929.  H. W. SUDDS  1,727,083
TRAP
Filed Jan. 10, 1928
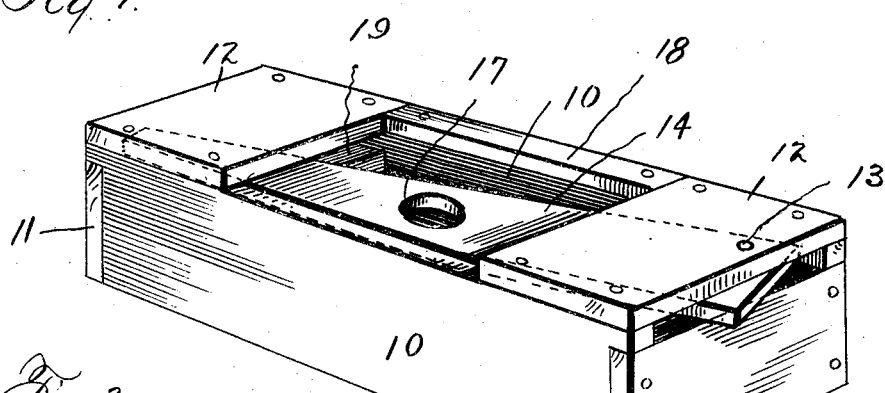
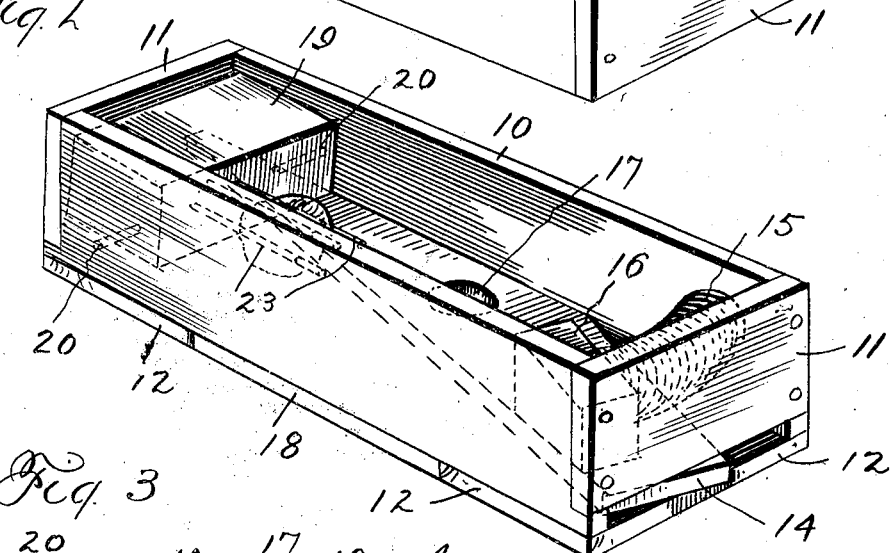
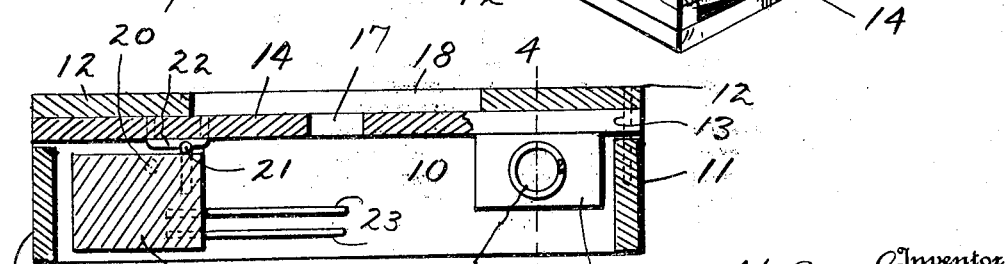
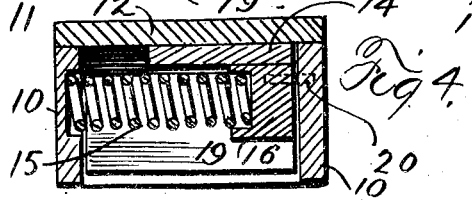

Patented Sept. 3, 1929.

1,727,083

UNITED STATES PATENT OFFICE.

HARRY W. SUDDS, OF BUTLER, PENNSYLVANIA.

TRAP.

Application filed January 10, 1928. Serial No. 245,749.

The object of my invention is to provide an animal trap and especially a mouse trap which will embody the advantages of absence of danger of injury to the fingers or hand in setting; make unnecessary the touching of the dead body which is repugnant to some persons, especially women; will be certain in its trapping action; and withal inexpensive to make and sell.

My invention consists in whatever is described by or is included within the terms or scope of the appended claims.

In the drawings:

Fig. 1 is a perspective view of a mouse trap embodying my invention with the parts in set position;

Fig. 2 is a similar view with the trap in an inverted or upside down position;

Fig. 3 is a longitudinal section with the trap in position for use;

Fig. 4 is a transverse section on the line 4—4, Fig. 3.

The embodiment of my invention shown in the drawings includes an oblong frame preferably made of wood that has two parallel vertical sides, 10, vertical ends, 11, secured to and connecting the sides at the ends, and two horizontal cross pieces, 12, at the ends secured to the top edges of the sides and having a substantial space between them. Pivoted to one end by a vertical pin or nail, 13, between one of the top pieces, 12, and the adjacent end is a horizontally extending arm, 14, made of a strip of wood and which extends across the space between the two top pieces and reaches between the other top piece and the other end so that when it swings on its pivot it is thereby supported and guided. It is swung in its catching or trapping movement by a helical spring, 15, which at one end is seated in a socket in a block, 16, secured to the underside of the catcher arm, and at its other end in a socket at the opposite side, 10, and said catcher arm or finger is, of course, move in the opposite direction by hand in setting the trap and for that purpose it has a finger-hole, 17, into which the end of the finger may be thrust or placed to move it. When actuated by the spring one side or edge of said catcher arm moves towards the adjacent side, 10, and if the head or neck of a mouse is thrust between said edge and said side it will be struck with all required force to kill and hold the creature. Preferably a ledge or flange, 18, projects inward from said side, 10, to slightly overhang the inner surface thereof and provide an edge or bearing against which the portion of the mouse in the path of the catcher arm will engage.

Between the sides, 10, at the end opposite the catcher arm pivot is the bait-carrying and latching device which comprises a block of wood, 19, which by a simple wire pin, 20, at each end is pivoted to the adjacent side so that it may rock on a horizontal axis to place a catch, 21, consisting of a piece of wire driven into the block into and out of engagement with a latch, 22, on the under side of the catcher arm consisting of a staple-like piece of wire driven into the arm. The bait-holder consists of several straight wires, 23, driven into and projecting horizontally from the block and lying in the lower part of the enclosure so that a mouse standing on the top of the frame will of necessity thrust its head down into the space between the catcher arm and the adjacent side wall and by the slightest pressure upon the bait trigger the block will be rocked downward and the catcher arm released.

In baiting the trap the bait is applied to the holding wires from the bottom through the open space between the sides and then with the trap rightside up the finger is thrust in the finger-hole in the arm and the latter swung to set position. It will be automatically latched by the movement of the trigger, which is unbalanced so that it normally tends to swing into latching position.

It will be observed that in the baiting and setting operation there is no position occupied by the hand or fingers in which injury can result by the accidental springing of the trap. It will be seen that a dead animal caught in the trap may be released without touching it with the fingers at all and merely by moving the catcher arm to release the dead body and permit it to fall out of the trap.

What I claim is:

1. An animal trap comprising a frame with side and end walls and open at the top, a spring-actuated catcher arm having an edge that cooperates with one of the side walls and movable horizontally across the opening at the top; and a trigger situated between the side walls with bait-holding means accessible to the animal by reaching a portion of its body downward between the cooperating parts of the catcher and side wall.

2. An animal trap comprising a frame with side and end walls and open at the top, a spring-actuated catcher arm having an edge that cooperates with one of the side walls and movable horizontally across the opening at the top; and a trigger situated between the side walls with bait-holding means accessible to the animal by reaching a portion of its body downward between the cooperating parts of the catcher and side wall, from above and the frame being open at the bottom for baiting.

3. An animal trap comprising a frame with side and end walls, a spring-actuated catcher arm having an edge that cooperates with one of the side walls, and a trigger situated between the side walls with bait-holding means accessible to the animal by reaching a portion of its body between the cooperating parts of the catcher and side wall, said trigger being a block pivoted between the side walls, the bait supporting means projecting horizontally therefrom.

4. An animal trap comprising a frame with side and end walls and open at the top, a spring-actuated catcher arm having an edge that cooperates with one of the side walls and movable horizontally across the opening at the top; and a trigger situated between the side walls with bait-holding means accessible to the animal by reaching a portion of its body downward between the cooperating parts of the catcher and side wall, said catcher arm having a finger-hole.

5. An animal trap comprising spaced apart sides and ends, a catcher arm situated between the sides and pivoted at one end and extending across an open space to the opposite end, a helical expansion spring bearing at one end against one of the sides and a block on the underside of said catcher arm against which the other end of said spring bears and exerts endwise thrust.

6. An animal trap comprising a pair of vertically spaced apart sides, ends connecting opposite ends of the sides, cross pieces on the tops of the sides spaced apart horizontally, a catcher arm pivoted at one end between one of said cross pieces and an adjacent end and extending across such space between said pieces, a bait-holding trigger coacting with the free end of said arm, and a spring for moving said arm in one direction situated in the space enclosed by said sides and ends, and bearing at one end against one of the sides.

In testimony whereof I hereunto affix my signature.

HARRY W. SUDDS.